United States Patent
Gardner

(10) Patent No.: US 6,673,279 B2
(45) Date of Patent: Jan. 6, 2004

(54) METHOD OF FORMING ECOCERAMIC-BASED SILICON-CARBIDE TOOLING FOR COMPOSITES AND METHOD FOR FORMING COMPOSITES USING SAME

(75) Inventor: Slade H. Gardner, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 68 days.

(21) Appl. No.: 10/044,738

(22) Filed: Jan. 11, 2002

(65) Prior Publication Data

US 2003/0132540 A1 Jul. 17, 2003

(51) Int. Cl.⁷ .................................. C01B 31/00
(52) U.S. Cl. ......................... 264/29.6; 264/29.7
(58) Field of Search .................. 264/29.1, 29.7, 264/29.6

(56) References Cited

U.S. PATENT DOCUMENTS

| | | | |
|---|---|---|---|
| 5,865,922 A | * | 2/1999 | Behrendt et al. |
| 6,124,028 A | * | 9/2000 | Nagle et al. |
| 6,357,144 B1 | * | 3/2002 | Nilsson et al. |

FOREIGN PATENT DOCUMENTS

| | | |
|---|---|---|
| DE | 19947731 A1 | 4/2001 |
| DE | 10020655 A1 | 8/2001 |
| GB | 755046 A | 8/1956 |

OTHER PUBLICATIONS

*Biostructure Derived Ceramics*, Sieber et al., 24th Annual Conference on Composites, Advanced Ceramics, Materials, and Structures, Jan. 23–28, 2000.

*Biomorphic Cellular Silicon Carbide Ceramics from Wood: I. Processing and Mictrostructure*, Greil et al., Journal of the European Ceramic Society, Elsevier Science Publishers, Barking, Essex, GB, Dec. 12, 1998.

*Materials & Structures TOP3–00091*, Technology Opportunity, "Affordable, Robust Ceramic Joining Technology (ARCJoinT)" (2 pages).

*Materials & Structures TOP3–00117*, Technology Opportunity, "Affordable Fiber Reinforced Ceramic Matrix Composites" (2 pages).

*Materials & Structures TOP3–00078*, Technology Opportunity, "Low Cost Silicon Carbide–Based Ceramics with Tailorable Microstructure and Properties" (2 pages).

*Materials & Structures TOP3–00138*, Technology Opportunity, "Environment Conscious Ceramics (Ecoceramics)" (2 pages).

*Ceramic Engineering and Science Proceedings (2000) in press*, "Environment Conscious Ceramics (Ecoceramics)"(5 pages).

* cited by examiner

Primary Examiner—Christopher A. Fiorilla

(57) ABSTRACT

A method is provided for forming items from ecoceramic-based silicon-carbide. A wood preform is machined to a general shape having over- or undersized dimensions. The preform is pyrolyzed to transform the wood of the preform to a porous, carbonaceous material that retains the general shape of the preform. The preform is then machined to final, net-shape dimensions and immersed in liquid silicon or silicon alloy that penetrates and infuses the preform. The infused preform is held at a temperature sufficient to cause the transformation of the material in the preform to silicon carbide, completing formation of the item. Also provided is a method of forming ecoceramic-based tooling and composite components using the tooling.

36 Claims, 3 Drawing Sheets

METHOD OF FORMING ECOCERAMIC-BASED SILICON-CARBIDE TOOLING FOR COMPOSITES AND METHOD FOR FORMING COMPOSITES USING SAME

BACKGROUND OF THE INVENTION

1. Field of the Invention

This invention relates generally to forming silicon-carbide tooling and relates specifically to forming tooling used for layup and curing of composite structures.

2. Description of the Prior Art

Tooling for production of composite aircraft parts have close tolerances for dimensional control and are typically made from invar alloy. Invar can be characterized as an expensive material which is difficult to machine. However, an attractive feature of invar is a very low coefficient of thermal expansion (CTE) of approximately 1.5 $\mu$in./in./° F. at temperatures up to 400° F. For applications such as making flat laminates, other tooling materials are sometimes used, including aluminum and steel, and have CTE values of approximately 14 $\mu$in./in./° F. and 7 $\mu$in./in./° F., respectively.

A low CTE is necessary for producing high-temperature-cure polymer-matrix/carbon-fiber composites with precise dimensional accuracy. A mismatch in the CTE of the composite material and the tooling material will cause complications for maintaining dimensional accuracy. The CTE of a typical polymer-matrix/carbon-fiber composite is difficult to characterize precisely because it is a multi-component system. Carbon fiber has a small, negative CTE and a typical polymer matrix systems for structural aircraft composite components have a CTE in the range of 15–50 $\mu$in./in./° F. The CTE of a specific composite system will be dependent upon the lay-up construction and the composition.

Recently, technology has been developed at NASA Glenn Research Center to produce very economical, complex-shaped, silicon carbide (SiC) ceramic structures from wood precursors, called "ecoceramics." To produce the ceramics, a wood preform is pyrolyzed in an inert atmosphere to convert the organic material into a carbonaceous form. The preform is infused with liquid silicon or silicon alloy, and the infiltrated preform is converted to a SiC in a high temperatures furnace. These materials have tailorable microstructures, low manufacturing costs, and can be easily machined in precursor stage before forming near-net shape ceramic structures. The targeted applications for this material have been seals, rings and filters for automotive applications; and armor, bricks, foundry crucibles and furnace components. These applications make use of the high service temperature of SiC (1350° C.).

One limitation of the NASA process, however, is that it is limited to small pieces of wood, especially those having a thickness of less than 1 in. With larger pieces of wood, cracking and warping are caused as the wood is dried and pyrolyzed, causing loss of tolerance and defects in the structure.

It is generally accepted that a material having a low CTE is desirable for use as composite tooling, and the CTE of SiC is approximately 2.5 $\mu$in./in./° F. in the temperature range of 70–2282° F. There exists a need for low-cost, easily-manufactured, SiC tooling for use in forming composite components of many sizes and thicknesses.

SUMMARY OF THE INVENTION

A method is provided for forming items from ecoceramic-based silicon-carbide. A wood preform is machined to a general shape having over- or undersized dimensions. The preform is pyrolyzed to transform the wood of the preform to a porous, carbonaceous material that retains the general shape of the preform. The preform is then machined to final, net-shape dimensions and immersed in liquid silicon or silicon alloy that penetrates and infuses the preform. The infused preform is held at a temperature sufficient to cause the transformation of the material in the preform to silicon carbide, completing formation of the item. Also provided is a method of forming ecoceramic-based tooling and composite components using the tooling.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

Figure 1:
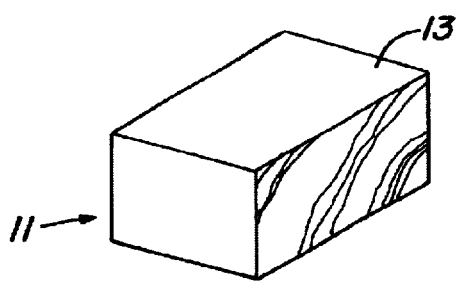
FIG. 1 is a perspective view of a wooden preform for use in producing a tool in accordance with the present invention.
Figure 2:
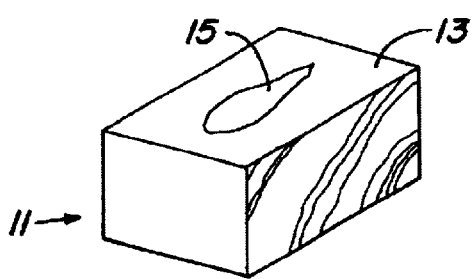
FIG. 2 is a perspective view of the wooden preform of FIG. 1 after the first machining step of the method of the present invention.

FIG. 1 shows a wood preform 11, which maybe formed from one of several varieties of trees, e.g., black walnut or maple. As shown in the figures, preform 11 is a rectangular solid, though preform 11 may be of any shape capable of withstanding the process described below. Preform 11 has an upper surface 13 into which a recess 15 is machined, recess 15 having a rough, general shape of the desired negative mold, as shown in FIG. 2. The negative mold is machined to have undersized dimensions, allowing for machining to the desired dimensions of the finished mold after subsequent steps. As illustrated in FIG. 2, the rough shape of recess 15 lacks the smooth contours of the desired shape (shown in FIGS. 4 and 6). Because wood is relatively soft when compared to normal tooling materials, such as invar alloy, machining preform 11 is quick and causes little wear on the tools used in the machining process. Though not shown, a positive mold would require an oversized rough shape to provide for additional material to be machined in later steps.

Once recess 15 is cut into preform 11, preform 11 is pyrolyzed in an inert atmosphere. To prevent combustion of preform 11, an inert gas, preferably argon, is used within the furnace, the argon displacing oxygen-rich air. Because preform 11 has moisture within it, preform 11 is first slowly dried to prevent cracking of preform 11 that could occur during pyrolyzation.

The preferred method of drying preform 11 involves covering preform 11 with a vacuum bag, applying vacuum to the bag, then placing the bagged preform 11 in a pressurized autoclave and increasing the temperature within the autoclave. For example, the temperature in the autoclave is raised at up to 10° C. per minute to a temperature of 90° C. to 120° C., where it is held for several hours, allowing for moisture to be removed without damage to preform 11. The pressurized atmosphere minimizes the temperature gradients in the autoclave and in preform 11, which reduces the chance of preform 11 warping during drying. Also, the pressurized atmosphere within the autoclave, which may be up to 90 psi of nitrogen, applies pressure to the outer surfaces of preform 11, reducing the amount of cracking occurring in larger preforms 11. The vacuum bag allows for negative pressure to be applied to preform 11, enhancing the process of moisture removal prior to the water turning to steam, which may cause cracking of preform 11.

The drying step may also be divided into two steps to avoid cracking in thick preforms 11. For example, the autoclave may be raised to approximately 90° C. and held for 2 hours to 24 hours for an initial drying. For best results, vacuum should be applied to the bag at the beginning of the cycle. Then the temperature can be raised at up to 1° C. per minute to between 100° C. and 120° C. and held for an additional 2 hours to 24 hours, ensuring a complete drying of preform 11.

The next step is to remove preform 11 from the autoclave, remove the vacuum bag, then replace preform 11 in the autoclave with a pressurized nitrogen atmosphere, preferably 15 psi to 90 psi. The pressure in the autoclave minimizes thermal gradients in the autoclave and provides increased hydrodynamic pressure to maintain the dimensional stability of preform 11. The temperature within the autoclave is slowly increased again at up to 5° C. per minute to preferably between 100° C. and 120° C. and is held for 1 hour to 10 hours, then is preferably ramped upward to 220° C. at the rate of approximately 0.28° C. per minute.

When preform 11 approaches 220° C., an oily residue, referred to as bio-oil, and vapors begin to emerge from preform 11. Bio-oils are a mixture of chemicals resulting from the decomposition of organic matter within the wood of preform 11. The vacuum bag is removed before this step to prevent bio-oil and vapors from entering vacuum lines and to obviate the need for providing bleed cloths within the bag to absorb the bio-oil as it is produced.

Once the temperature has reached 220° C., the rate of increase of the temperature is preferably reduced to approximately 0.17° C. per minute until the temperature reaches between 375° C. and 425° C., though the rate may be up to 1° C. per minute. Preform 11 is preferably held at approximately 400° C. for 1 hour to 10 hours, the ambient pressure assisting in extracting the bio-oil. Afterward, preform 11 is removed from the autoclave, cooled, then inserted into a furnace where preform 11 is heated to a higher temperature than in the autoclave.

The furnace preferably has a constantly-flowing argon or nitrogen atmosphere at 1 psig to 10 psig. The temperature in the furnace is raised to approximately 400° C. at 1° C. to 5° C. per minute, then held from 1 hour to 10 hours. The temperature is then raised to between 900° C. and 1100° C. at a rate of up to 1° C. per minute, and preform 11 is held at that temperature for approximately 1 hour to 10 hours. Preform 11 is then cooled to room temperature at a rate of approximately 1° C. to 5° C., preferably under constantly flowing nitrogen or argon.

Figure 3:
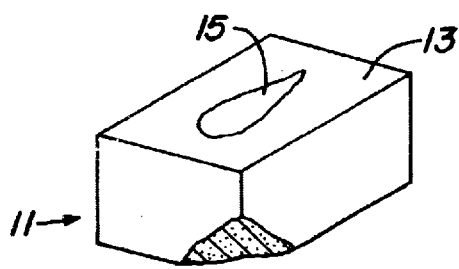
FIG. 3 is a perspective view of the preform of FIG. 1 after the pyrolyzing step of the method of the present invention.

At this point, all of the material within preform 11 is completely pyrolyzed. The entire pyrolyzation process may take approximately 90 hours, though the time may be longer or shorter for different woods, thicknesses, shapes, etc. A pyrolyzed preform 11 is shown in FIG. 3, a lower corner having been removed to reveal the carbonaceous, foam-like material remaining in preform 11.

Figure 4:
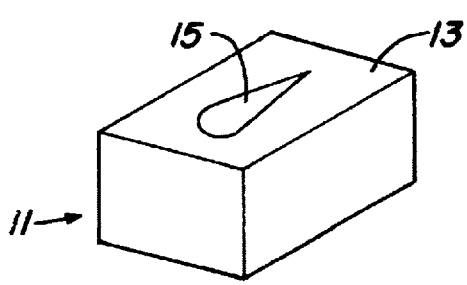
FIG. 4 is a perspective view of the preform of FIG. 1 after the additional machining step of the method of the present invention.

After pyrolyzing preform 11, recess 15 in upper surface 13 is machined to net-shape dimensions. By machining again after the pyrolyzation, dimensional changes in recess 15 caused by the pyrolyzation can be accounted for while also removing the additional material in recess 15 due to the undersize dimensions. FIG. 4 shows recess 15 as having the desired smooth contours of the finished mold. The machining of the pyrolyzed preform 11 requires very little effort and causes little to no wear on machine tools.

Figure 5:
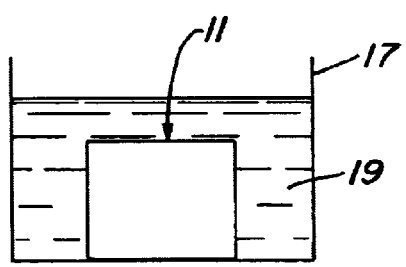
FIG. 5 is a schematic end view of the preform of FIG. 1 immersed in liquid silicon according to the method of the present invention.

To provide silicon and convert preform 11 into a SiC material, pyrolyzed preform 11 is immersed in a tank 17 containing liquid silicon or silicon alloy 19, shown in FIG. 5. Preform 11 is held in tank 17 and at a temperature from approximately 900° C. to 1450° C. for 20 to 90 minutes. Liquid silicon 19 is drawn into preform 11 by capillary action, filling the micropores of preform 11. The infusion may also be assisted by vacuum. Liquid silicon 19 readily infiltrates the pores of preform 11, where the silicon reacts with the carbon of preform 11 to form SiC. If a silicon alloy, such as silicon-refractory metal alloys, is used, refractory disilicide is precipitated as the silicon reacts with the carbon. In either case, the final result is a dense matrix comprising silicon carbide and some free silicon or, in the case of alloy infiltration, some additional precipitated disilicide.

Figure 6:
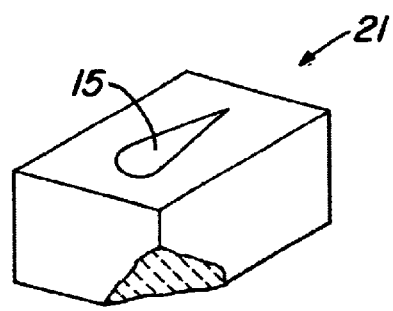
FIG. 6 is a perspective view of an ecoceramic tool formed from the preform of FIG. 1 and in accordance with the present invention.

FIG. 6 shows the finished tool 21 formed from preform 11. A corner of tool 21 has been removed to illustrate the ceramic structure throughout tool 21. While it is desirable for recess 15 to have net-shape dimensions after the immersion and heating steps, some machining may be required to dimension recess 15 to within desired tolerances. After typical tooling preparation, tool 21 maybe used to form components from composite materials.

Figure 7:
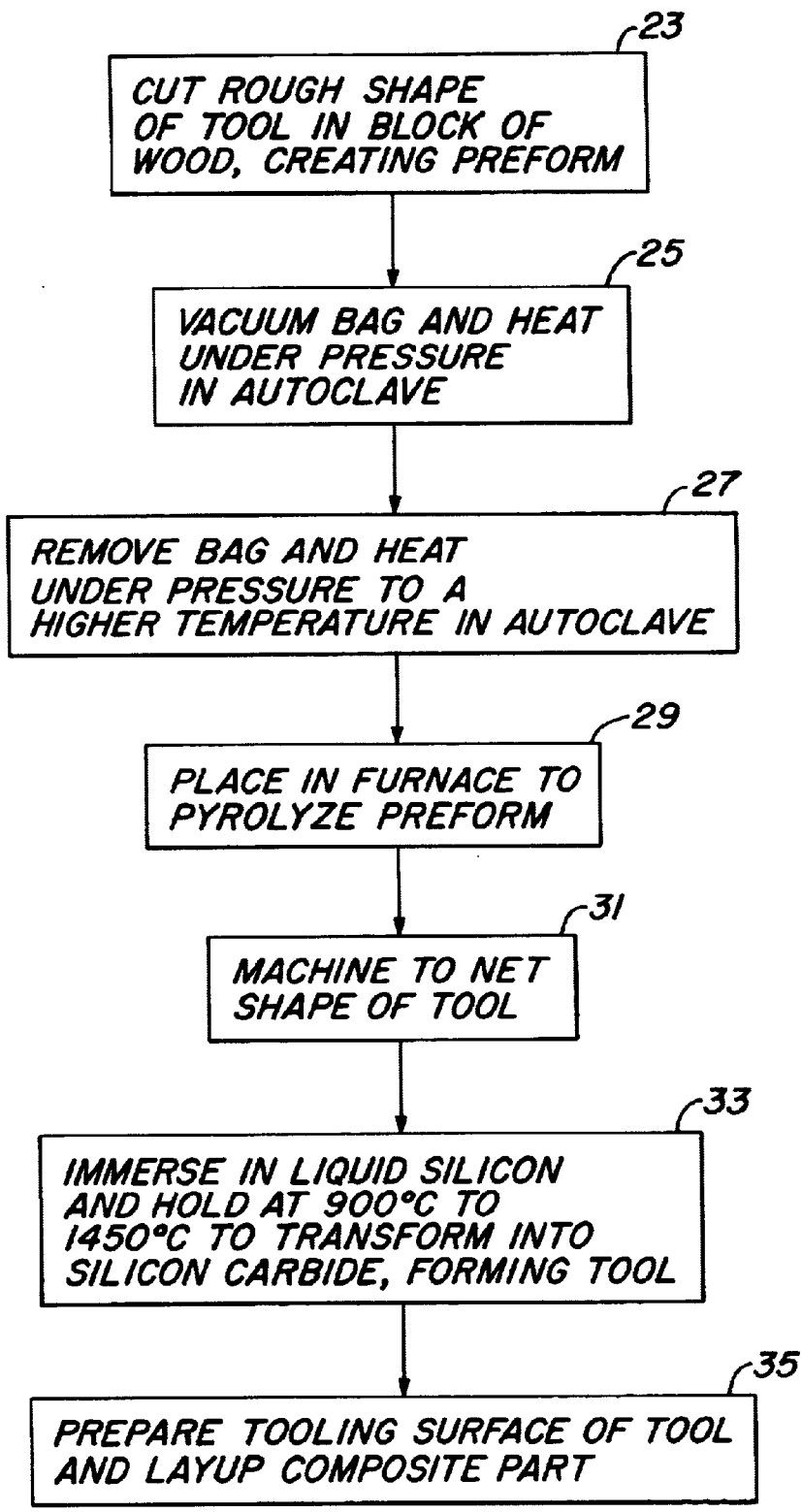
FIG. 7 is a flowchart depicting the steps of a method of the present invention.

FIG. 7 shows a flowchart containing the steps for creating a composite layup tool using the method described above. In addition, the method includes layup of a composite component as an optional last step of the method. The step of block 23 is the rough shaping of the preform, which is then vacuum bagged and heated in an autoclave, as described in block 25. In the step of block 27, the bag is removed, and the preform is heated to a higher temperature, preform releasing vapors and bio-oil. The preform is completely pyrolyzed in the step of block 29, then preform is machined to net-shape dimensions in the step of block 31. The step of block 33 is the immersion of the preform in liquid silicon at approximately 900° C. to 1450° C. to cause the formation of SiC. These steps may be used to form any type of ecoceramic part, component, or tooling, and the step of block 35 provides for layup of composite parts on the tooling, as shown in FIGS. 7 and 8.

Figure 8:
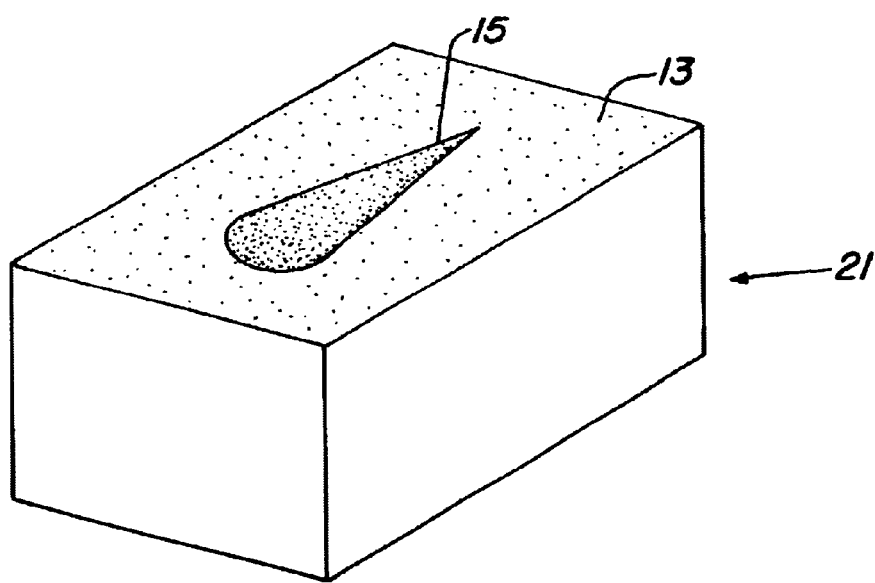
FIG. 8 is a perspective view of the tool of FIG. 6 after application of a mold release.

To prevent composite components formed on tool 21 from adhering to upper surface 13 and mold details such as recess 15, a mold release, or mold sealant, is applied to upper surface 13, as shown in FIG. 8. Mold release may be a wax or other form of release that coats surface 13 to limit the difficulty of removal of a composite component after the resin in the component is cured.

Figure 9:
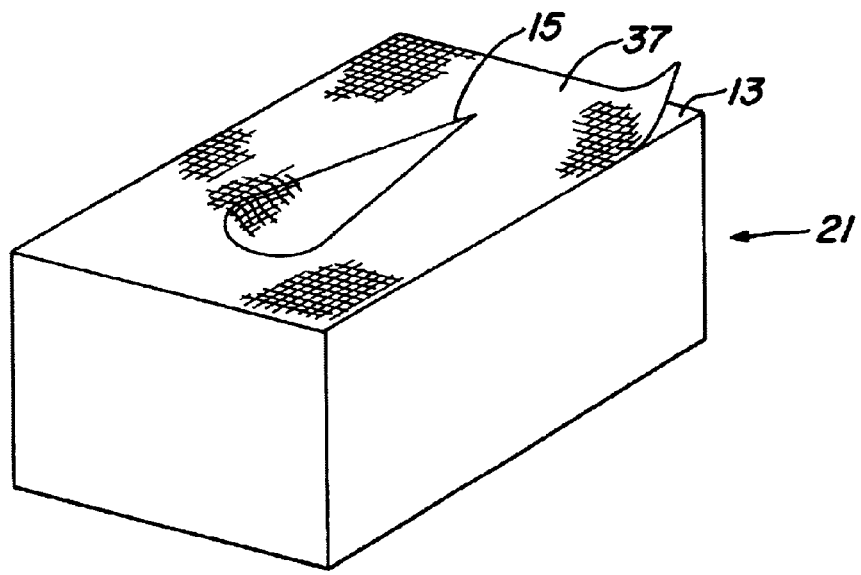
FIG. 9 is a perspective view of the tool of FIG. 6 with a composite component being formed on the tool.

FIG. 9 shows a composite component 37 being formed on tool 21. Component 37 is formed from composite materials, typically multiple layers of woven fabric, though other types of fiber layers maybe used, for example, fiber mats having short fibers in random orientations. The layers are preferably impregnated with an uncured resin prior to layup, but resin may be brushed on or otherwise applied to dry layers after each layer is placed on tool 21. Layers of component 37 are laid on surface 13, conforming to the contours of recess 15. A debulking process may be performed during layup to remove excess resin and to compact the layers. After the desired number of layers is applied, component 37 is cured while remaining on tool 21, curing typically occurring within an autoclave or other type of oven. Component 37 is then removed from tool 21.

The advantages of using the present invention to form large ecoceramic components, such as large tooling structures, is that limitations to the size of wood preforms are determined only by the size of the furnaces used, not by the cracking or warping problems of prior methods. Furnaces exist which are large enough to accommodate any current composite tooling structure used in aerospace manufacturing. Also, techniques have been developed for joining multiple SiC components using the same heating process that converts the infused carbonaceous material to SiC. Therefore, very complex tooling structures can be formed from several pieces.

There are several advantages to using ecoceramics for composite tooling. Since all the machining is done in the wood or the carbonized state of the material, ecoceramics provide a faster and more economical alternative to machining tooling from metal, especially when considering the difficulty in machining invar alloy. Silicon and silicon alloys are inexpensive materials, and heating costs are relatively insignificant. The ecoceramic material has other advantages over the traditional tooling materials in that it is more dent resistant, can be repaired, and has a capability of withstanding higher temperatures.

While the invention has been shown in only one of its forms, it should be apparent to those skilled in the art that it is not so limited but is susceptible to various changes without departing from the scope of the invention. For example, wood particles, such as sawdust, can be mixed with binders and used to form the preform. The binders are carbonized along with the wood during the pyrolyzation step.

I claim:

1. A method of forming a silicon-carbide item, the method comprising:
    (a) forming a preform from wood, then
    (b) applying a vacuum to substantially surround the perform, then
    (c) heating the preform under pressure to a first temperature in an autoclave, then
    (d) heating the preform to a second temperature in a furnace at atmospheric pressure to pyrolyze the preform, the second temperature being higher than the first temperature; and then
    (e) infusing the preform with a liquid containing silicon for forming a silicon-carbide item that retains the shape of the preform.

2. The method of claim 1, wherein:
    in step (e), the liquid is an alloy, and wherein the liquid infiltrates pores of the preform.

3. The method of claim 1, wherein:
    in step (e), after infusion, the preform is held for a selected time at a temperature between approximately 900° C. and approximately 1450°.

4. The method of claim 1, further comprising:
    after step (d) and before step (e), machining the preform to net-shape dimensions to thereby account for changes in the perform caused by pyrolization.

5. The method of claim 1, wherein:
    step (a) comprises forming the preform from a solid block of wood, wherein the step of applying a vacuum applied to substantially surround the preform prior to the step of heating the preform under pressure in the autoclave includes the steps of covering the preform with a vacuum bag and evacuating air from the bag, and wherein the pressure in the autoclave minimizes temperature gradients in the autoclave and in the preform to thereby maintain dimensional stability in the preform.

6. The method of claim 1, wherein:
    step (a) comprises forming the preform from wood particles and binders, wherein the step of applying a vacuum is applied to substantially surround the preform prior to the step of heating the perform under pressure in the autoclave includes the steps of covering the preform with a vacuum bag and evacuating air from the bag, and wherein the pressure in the autoclave minimizes temperature gradients in the autoclave and in the perform to thereby maintain dimensional stability of the preform.

7. The method of claim 1, wherein:
    the first temperature is between 375° C. and 400° C.

8. The method of claim 1, wherein:
    the second temperature is between 900° C. and 1100° C.

9. The method of claim 1, wherein:
    the first temperature is approximately 400° C.; and
    the second temperature is approximately 1000° C.

10. The method of claim 1, wherein:
    step (c) comprises increasing the temperature of the autoclave from a starting temperature to the first temperature at a maximum rate of 5° C. per minute, and wherein the temperature is increased to a level to cause bio-oil to emerge from the preform.

11. The method of claim 1, wherein:
    step (d) comprises increasing the temperature of the furnace from a starting temperature to the second temperature at a maximum rate of 5° C. per minute, wherein the furnace includes an inert gas being used therein to prevent combustion, and the method further comprising cooling the preform under constantly flow of the inert gas prior to step (e).

12. The method of claim 1, wherein:
    step (e) comprises increasing the temperature of the autoclave from a starting temperature to the first temperature at a maximum rate of 5° C. per minute; and
    step (d) comprises increasing the temperature of the furnace from a starting temperature to the second temperature at a maximum rate of 5° C. per minute.

13. The method of claim 1, further comprising machining a recess into an upper surface of the perform after the perform is formed and prior to the step of heating the perform under pressure, and wherein step (b) comprises:
    covering the preform with a vacuum bag and evacuating air from the bag, then wherein step (c) comprises
        heating the preform and vacuum bag to a drying temperature lower than the first temperature; then removing the vacuum bag and heating the preform to the first temperature.

14. A method of forming a silicon-carbide item, the method comprising:
   (a) forming a preform from wood, then
   (b) covering the preform with a vacuum bag and evacuating air from the bag, then
   (c) heating the preform and vacuum bag under pressure to a drying temperature in an autoclave, then
   (d) removing the vacuum bag and heating the preform under pressure to a first temperature in the autoclave, the first temperature being higher than the drying temperature; then
   (e) heating the preform to a second temperature in a furnace at atmospheric pressure to pyrolyze the preform, the second temperature being higher than the first temperature; and then
   (f) infusing the preform with a liquid containing silicon for forming a silicon-carbide item that retains the shape of the preform.

15. The method of claim 14, wherein
in step (f), the liquid is a alloy.

16. The method of claim 14, wherein
in step (f), after infusion, the preform is held for a selected time at a temperature between approximately 900° C. and approximately 1450°.

17. The method of claim 14, further comprising:
after step (e) and before step (f), machining the preform to net-shape dimensions.

18. The method of claim 14, wherein:
step (a) comprises forming the preform from a solid block of wood.

19. The method of claim 14, wherein:
step (a) comprises forming the preform from wood particles and binders.

20. The method of claim 14, wherein:
the first temperature is between 375° C. and 400° C.

21. The method of claim 14, wherein:
the second temperature is between 900° C. and 1100° C.

22. The method of claim 14, wherein:
the first temperature is approximately 400° C.; and
the second temperature is approximately 1000° C.

23. The method of claim 14, wherein:
step (d) comprises increasing the temperature of the autoclave from a starting temperature to the first temperature at a maximum rate of 5° C. per minute.

24. The method of claim 14, wherein:
step (e) comprises increasing the temperature of the furnace from a starting temperature to the second temperature at a maximum rate of 5° C. per minute.

25. The method of claim 14, wherein:
step (d) comprises increasing the temperature of the autoclave from a starting temperature to the first temperature at a maximum rate of 5° C. per minute, and
step (e) comprises increasing the temperature of the furnace from a starting temperature to the second temperature at a maximum rate of 5° C. per minute.

26. A method of forming composite component, the method comprising:
   (a) forming a preform from wood, the preform being shaped as a mold; then
   (b) pyrolyzing the preform, then
   (c) infusing the preform with liquid containing silicon, then
   (d) holding the infused preform at a selected temperature to form a silicon-carbide tool that retains the shape of the preform, the tool having at least one tooling surface for receiving layers of composite material; then
   (e) applying the layers of composite material to the tooling surface to form the component, then
   (f) curing the component on the tooling surface, and then
   (g) removing the cured component from the tool.

27. The method of claim 26, wherein:
in step (c), the liquid is an alloy.

28. The method of claim 26, wherein:
in step (d), the selected temperature is between approximately 900° C. and approximately 1450°.

29. The method of claim 26, wherein step (b) comprises:
heating the preform under pressure to a first temperature in an autoclave, then
heating the preform to a second temperature in a furnace, the second temperature being higher than the first temperature.

30. The method of claim 26, wherein:
step (a) comprises forming the preform from a solid block of wood.

31. The method of claim 26, wherein:
step (a) comprises forming the preform from wood particles and binders.

32. The method of claim 26, further comprising:
after step (d) and before step (e), applying a mold release to the tooling surface.

33. The method of claim 26, wherein:
step (a) comprises forming the tool as a negative mold, the dimensions of the mold being undersized.

34. The method of claim 26, wherein:
step (a) comprises forming the tool as a positive mold, the dimensions of the mold being oversized.

35. A method of forming a silicon-carbide item, the method comprising:
   (a) forming a preform from wood, then
   (b) heating the preform under pressure to a first temperature in an autoclave, the step of heating the perform under pressure including the steps of covering the preform with a vacuum bag, evacuating air from the bag, then heating the preform and vacuum bag to a drying temperature lower than the first temperature, then removing the vacuum bag and heating the preform to the first temperature, then
   (c) heating the preform to a second temperature in a furnace at atmospheric pressure to pyrolyze the preform, the second temperature being higher than the first temperature, and then
   (d) infusing the preform with a liquid containing silicon for forming a silicon-carbide item that retains the shape of the preform.

36. A method of forming a silicon-carbide item, the method comprising:
   (a) forming a preform from wood, then
   (b) machining a recess into an upper surface of the preform after the preform is formed, then
   (c) heating the preform under pressure to a first temperature in an autoclave, the step of heating the perform under pressure including the steps of covering the preform with a vacuum bag, evacuating air from the bag, then heating the preform and vacuum bag to a drying temperature lower than the first temperature, then removing the vacuum bag and heating the preform to the first temperature, then
   (d) heating the preform to a second temperature in a furnace at atmospheric pressure to pyrolyze the preform, the second temperature being higher than the first temperature, and then
   (e) infusing the preform with a liquid containing silicon for forming a silicon-carbide item that retains the shape of the preform.

* * * * *